(12) United States Patent
Nagayama et al.

(10) Patent No.: US 6,988,765 B2
(45) Date of Patent: Jan. 24, 2006

(54) VEHICLE BODY STRUCTURE WITH HEAT RADIATION INSULATING ARRANGEMENT

(75) Inventors: Hiroki Nagayama, Yokohama (JP); Hiroaki Harata, Yokohama (JP); Toshiya Shibukawa, Zushi (JP)

(73) Assignee: Nissan Motor Co., Ltd., Kanagawa (JP)

( * ) Notice: Subject to any disclaimer, the term of this patent is extended or adjusted under 35 U.S.C. 154(b) by 91 days.

(21) Appl. No.: 10/833,004

(22) Filed: Apr. 28, 2004

(65) Prior Publication Data

US 2004/0222671 A1    Nov. 11, 2004

(30) Foreign Application Priority Data

May 9, 2003    (JP) ............................. 2003-130942

(51) Int. Cl.
B62D 25/06    (2006.01)

(52) U.S. Cl. ...................... 296/211; 296/39.1; 296/97.2

(58) Field of Classification Search ............... 296/39.1, 296/97.2, 211
See application file for complete search history.

(56) References Cited

U.S. PATENT DOCUMENTS

| | | | |
|---|---|---|---|
| 3,400,972 A * | 9/1968 | Woodward et al. ........ 296/97.2 |
| 4,451,514 A * | 5/1984 | Hunt ........................... 296/211 |
| 4,513,548 A * | 4/1985 | Parker ......................... 296/211 |
| 4,759,581 A * | 7/1988 | McNamee .................. 296/97.7 |
| 5,120,593 A * | 6/1992 | Kurihara ..................... 296/211 |
| 6,120,090 A * | 9/2000 | Van Ert et al. ............. 296/211 |
| 6,679,548 B2 * | 1/2004 | Teschner et al. ............ 296/211 |

FOREIGN PATENT DOCUMENTS

| | | |
|---|---|---|
| JP | 9-295509 A | 11/1997 |
| JP | 2002-331822 A | 11/2002 |

* cited by examiner

Primary Examiner—Lori L. Coletta

(74) Attorney, Agent, or Firm—Shinjyu Global IP Counselors, LLP

(57) ABSTRACT

A vehicle body structure has a heat radiation insulating arrangement that improves the thermal environment inside a vehicle cabin when the vehicle is positioned at a sunny location during hot weather by increasing the insulation effects of the automobile body along with blocking radiant heat. The heat radiation insulating arrangement of vehicle body structure forms a first space by arranging a light shielding shade on the inside of a windowpane, a second space formed between the exterior roof panel and ceiling material, and an air passageway that links the first space and the second space to allow the air to flow from the first space to the second space. A reflective material is provided on the surface of the second space of the ceiling material.

20 Claims, 2 Drawing Sheets

VEHICLE BODY STRUCTURE WITH HEAT RADIATION INSULATING ARRANGEMENT

BACKGROUND OF THE INVENTION

1. Field of the Invention

The present invention generally relates to a vehicle body structure with a heat radiation insulation arrangement for an automobile. More specifically, present invention relates to a vehicle insulation system that improves the thermal environment inside the interior cabin of the automobile by eliminating heat held inside the automobile during hot weather.

2. Background Information

A temperature in a vehicle cabin of a parked automobile becomes extremely high under the blazing sun in summer season. For example, in some cases, an air temperature in the vehicle cabin reaches nearly 70° C. Needless to say, it is unpleasant for occupants to ride in the vehicle under such a situation. In addition, even after the operation of ventilation or air-conditioning is started, a surface temperature of an interior part will not be easily lowered, and radiation heat emanated over a long time greatly discomforts the occupants. Thus, it goes without saying that improvements to this type of uncomfortable condition are strongly preferred.

With regard to such a problem of parking a vehicle in the blazing sunshine, there have been a number of proposed methods to solve this problem. For example, one conventional method of improving the thermal environment inside the interior cabin for automobiles parked during hot weather is disclosed in Japanese Laid-Open Patent Publication No. 1997-295509. This publication proposes using solar cells to provide ventilation. Another method of proving the thermal environment inside the interior cabin for automobiles parked during hot weather is disclosed in Japanese Laid-Open Patent Publication No. 2002-331822. This publication proposes using a light shielding construction that provided a light shielding shade in an air passageway.

In view of the above, it will be apparent to those skilled in the art from this disclosure that there exists a need for an improved vehicle body structure with a heat radiation insulation arrangement for an automobile. This invention addresses this need in the art as well as other needs, which will become apparent to those skilled in the art from this disclosure.

SUMMARY OF THE INVENTION

It has been discovered that in the technology disclosed in Japanese Patent Laid-Open Patent Publication Nos. 1997-295509, only a small part of air inside the vehicle is exchanged with outside air. Also it has been discovered that the proposals in Japanese Laid-Open Patent Publication Nos. 1997-295509 and 2002-331822 require new large-scale devices to be installed in the automobile. Such new large-scale devices are not realistic from the viewpoint of the installation method of the devices and the automobile style. Moreover, such new large-scale devices are difficult to impractical due to increased weight and higher costs.

It has been further discovered that the effectiveness of reducing the cabin temperature using the technology introduced in Japanese Laid-Open Patent Publication No. 2002-331822 is effective. However, because the hot air held inside the space between the light shielding shade and the windshield is exhausted and ventilated mechanically, the construction is complicated. In addition, it is impossible to prevent heat from entering into the cabin over a period of time since the ceiling is only covered by ordinary insulating material.

In a construction that only uses a shade, there is also a possibility that the temperature of the interior cabin of an automobile may decrease by preventing sunlight from entering from the windshield into the cabin. However, since there is a large difference between the ceiling temperature and the interior cabin temperature, the heat entering from the ceiling reduces the effectiveness of the shade by 50%.

Further, when an ordinarily used light shielding shade is installed, high temperature air will be held between the shade and the wind shield over time resulting in the hot air flowing into the cabin thereby causing the cabin temperature to rise.

In view of this current state of technology, the coming and going of heat was once again analyzed when an automobile is parked during hot weather. It was discovered that the sun's energy passing through the windshield and shining into the interior cabin of an automobile passes through the window and automobile body on the side where the sunlight is generally not received and is then radiated by convective heat transfer. In view of this discovery, the vehicle body structure is designed to substantially reduce the effect following heat radiation towards the interior cabin of an automobile.

The object of the present invention is to improve the thermal environment inside an vehicle cabin when the automobile is positioned at a location during hot weather by increasing the insulation effects of the automobile body along with blocking radiant heat as well after realistically taking into consideration what can be achieved without greatly changing the basic styling and manufacturing process of current automobiles.

In order for the present invention to achieve the object mentioned above, a vehicle body structure is provided that basically comprises a vehicle cabin, a light shielding shade and a ceiling material. The vehicle cabin includes an exterior roof panel and a windowpane. The light shielding shade is arranged on a cabin interior side of the windowpane to form a first air space therebetween. The ceiling material is arranged on a cabin interior side of the exterior roof panel to form a second air space therebetween. The first and second air spaces are fluidly connected by an air passageway to allow air to flow between the first space and the second space. The ceiling material includes a reflective material disposed above an upper surface of the ceiling material.

In other words, the positional relationship in the vertical direction of the first These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
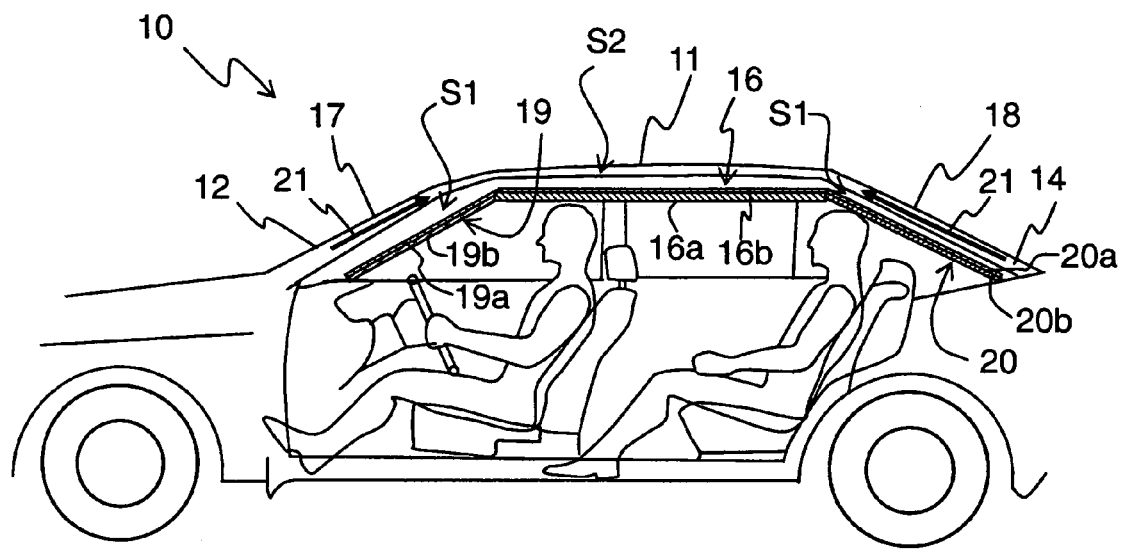
FIG. 1 is a partial diagrammatic side longitudinal cross sectional view of a vehicle equipped with a heat radiation insulating arrangement in accordance with one preferred embodiment of the present invention.
Figure 2:
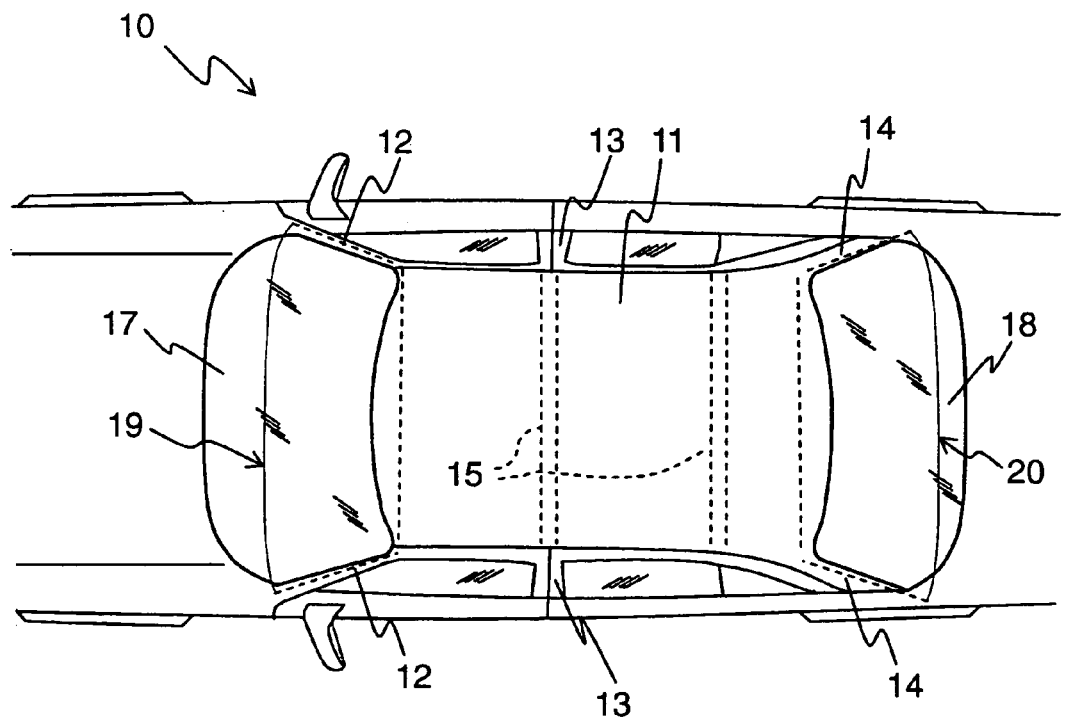
FIG. 2 is a partial diagrammatic top plan view of the vehicle illustrated in FIG. 1 with the heat radiation insulating arrangement in accordance with one preferred embodiment of the present invention.

Referring initially to FIGS. 1 and 2, a vehicle 10 is illustrated that is equipped with a heat radiation insulating arrangement in accordance with a first embodiment of the present invention. In particular, FIG. 1 is a partial diagrammatic longitudinal cross sectional view as seen from the side of the vehicle 10, while FIG. 2 is a partial diagrammatic top plan view of the vehicle 10. As shown in FIGS. 1 and 2, the vehicle 10 has a vehicle body structure having an exterior roof panel 11, a pair of front pillars 12, a pair of center pillars 13 and a pair of rear pillars 14. The exterior roof panel 11 has a plurality of supports 15 with a reflective ceiling material 16 secured to the supports 15 in a conventional manner. The reflective ceiling material 16 preferably at least includes an insulating layer or material 16a having a reflective layer or material 16b disposed on top of the upper surface of the insulating layer or material 16a.

The vehicle body structure also includes a front windshield or windowpane 17 that is disposed between the front pillars 12 in a conventional manner, and a rear windshield or windowpane 18 that is disposed between the rear pillars 13 in a conventional manner. The vehicle body structure further includes a front light shielding shade 19 arranged to overlie an interior surface of the front windowpane 17 and a rear light shielding shade 20 arranged to overlie an interior surface of the rear windowpane 18.

In one possible construction of the present invention, the edges of the front light shielding shade 19 are releasably fastened to the pillars 12, the ceiling material or trim and the interior dash panel with a seal form therebetween. Likewise, the rear light shielding shade 20 has its edges releasably fastened to the pillars 14, the ceiling material or trim and the interior rear panel with a seal form therebetween. Thus, the light shielding shades 19 and 20 form first spaces S1 with the windshields 17 and 18, respectively. Thus, the light shielding shades 19 and 20 are arranged on the inside of the front and rear windshield 17 and 18 such that each of the front and rear windshield 17 and 18 has a double insulating construction with the first space S1 formed therebetween. The reflective ceiling material 16 is spaced from the exterior roof panel 11 to form a second space S2. In other words, the spaces formed between the front and rear windshield 17 and 18 and the light shielding shades 19 and 20 are called the first spaces S1 and the space formed between the exterior roof panel 11 and the reflective ceiling material 16 is called the second space S2. The light shielding shades 19 and 20 have multi-layered constructions. Preferably, the light shielding shade 19 at least includes a reflective layer 19a and an insulating layer 19b, while the light shielding shade 20 preferably at least includes a reflective layer 20a and an insulating layer 20b.

In addition, several air passageways 21 are formed in the vehicle body structure to fluidly connect the first spaces S1 with the second space S2. These air passageways 21 allow the heat energy of the air located between the first spaces S1 and the second space S2, formed by the double construction, to be released from the vehicle cabin by the exterior roof panel 11. In other words, these air passageways 21 allow the air trapped in the first spaces S1 by the light shielding shades 19 and 20 to pass to the second space S2. The reflective ceiling material 16 and the light shielding shades 19 and 20 in this construction form the insulation construction that simultaneously prevent radiant heat from entering into the interior of the vehicle cabin.

In the illustrated embodiment, the air passageways 21 are formed in the front pillars 12 and the rear pillars 14. In other words, air openings are formed in pillars 12 and 14 such that air flows from the first spaces S1 through the pillars 12 and 14 and into the second space S2. If additional light shielding shades are used on the side windows, then air passageways can be formed in the center pillars 13 to allow the air trapped between the additional light shielding shades and the side windows to pass to the second space S2.

The insulating material 16a and the reflective material 16b overlie each other to form a multi-layered construction. Of course, each of the material 16a and 16b can each also be formed of several layers. The reflective material 16b is formed on the air passageway side of the reflective ceiling material 16. In contrast, the insulating material 16a is formed on the cabin interior side of the reflective ceiling material 16. The insulating material 16a comprises a fibrous aggregate and/or a foam layer that is adhered to the reflective material 16b. Any combination can be chosen for the construction of the insulating material 16a.

According to the construction described above, the air passageways 21 are configured and arranged to function as an insulated ventilation passageway that is insulated and partitioned inside the vehicle cabin.

Next, the operation of the vehicle body structure, described above, will be described. Normally, if glass is shielded by a shade, the temperature inside the vehicle cabin will drop although the difference between the ceiling temperature and the cabin temperature will become larger and the heat entering from the ceiling will increase. Because of this, the shading effect created by the light shielding shades 19 and 20 will decrease. Thus, this increase in ceiling temperature makes it impossible to obtain a desired cabin temperature reduction effect by merely using the light shielding shades. Further, in order to guide the high temperature air held inside the space between the shade and the windshield when there is only natural convection, the temperature inside the space must be greatly increased. As a result, there are problems of heat flowing to the inside of the vehicle cabin through the shades by heat conduction and convective heat transfer, which reduce the effectiveness of the shades.

As described above, the above-mentioned problems can be solved in the vehicle body structure of the present invention by arranging a shade, that has the reflective material 16b on the surface, inside the vehicle cabin and linking the space formed between the shade and the windshield to the space between the exterior roof panel 11 and the reflective material (preferably a reflective insulating material). Also by using the reflective material 16b (preferably a reflective insulating material) as an insulator of the reflective ceiling material 16. This construction creates a situation in which the low areas have low temperatures and the high areas have high temperatures. As a result, it possible to move the high temperature air inside the shade using the chimney effect without any driving force.

Because the second space is configured to allow air to flow between the exterior roof panel 11 and the reflective material 16b, heat on the panel side is radiated away from the high temperature air by convective heat transfer by the chimney effect moving the high temperature air trapped by the light shielding shades 19 and 20. Also the reflective material 16b effectively reflects the radiant heat from the ceiling such that the heat is then returned to the exterior roof panel 11.

In the present invention, the reflective material 16b provided on the surface of the reflective ceiling material 16 is provided with a reflective layer comprised by metallic foil and/or a metallic vapor deposition film on the side facing the second space S2 as well as a layered member formed by insulating layers comprising a fibrous aggregate and/or a foam layer on the reflective ceiling material 16.

In order to maintain the reflective capabilities for the reflective material 16b, it is preferable to keep a thin panel that has infrared reflective capabilities on the surface of the material. Further, a metallic foil or a film that has undergone metallic vapor deposition can be used alone or in combination for the thin panel that has infrared reflective capabilities. It is preferable for this thin panel has an infrared reflectance ratio of 70% or more for the ideal reflective material 16b. Seen from the viewpoint of material availability and ease-of-handling, it is even more preferable for this thin panel to be a thermal ray reflective film with metallic layers deposited on it that have infrared reflective capabilities.

The following materials can be used for the layers having infrared reflective capabilities used in the present invention: aluminum foil, copper foil, aluminum oxide, metallic vapor deposition film obtained by means of sputtering copper oxide on the surface of a resin film, aluminum foil onto which a clear resin layer is deposited, copper foil onto which a clear resin layer is deposited, resin film onto which aluminum is deposited, resin film that is a mixture of a reflective material and/or a white colored pigment, and metallic vapor deposition film obtained by means of sputtering aluminum oxide on a non-woven fabric comprised by polyester or polyester fiber. There are, however, no particular limitations on these materials.

When using aluminum foil, copper foil, aluminum foil onto which a clear resin layer is deposited, and copper foil onto which a clear resin layer is deposited, suitable thicknesses for these materials are from 1 $\mu$m to 1000 $\mu$m and in particular from 5 $\mu$m to 50 $\mu$m. There are, however, no particular limitations on these thicknesses.

When using aluminum vapor deposition resin film, resin film onto which a reflective paint is applied, or a resin film that is a mixture of either a reflective material and/or a white colored pigment, the resin can have an average transmission coefficient of 70% or more from visible light to the infrared region to make it difficult for the resin film to absorb thermal rays from surfaces that do not have reflective paint. There are no particular limitations on these types of materials although it is best to take properties such as heat resistance and pliability into consideration resulting in polyester or polyethylene as ideal candidates. It is ideal to handle resin film with a thickness of 5 $\mu$m to 100 $\mu$m. The thickness of the layer deposited onto aluminum is preferably within a range of 5 $\mu$m to 100 $\mu$m.

A reflective paint can be used that includes aluminum scales as the main component. The thickness of the reflective paint applied is ideally 10 nm to 100 $\mu$m and applied at the same time aluminum is deposited onto the resin. A mica powder with the above-mentioned aluminum scales or titania deposited on the surface is used for the reflective material and white colored pigment mixed into the resin. The content of the mica powder is from 0.001 to 0.2% weight. The transmission coefficient is high for a % weight of 0.001 or less and if mixed at % weight of 0.2 or more, the thermal ray reflective effect will become saturated. If it is 0.001% weight or less, the transmission coefficient will be high and even if it mixed at 0.2% weight or more, the thermal ray reflective effect will become saturated.

It is also preferable for the reflective material 16b to an emissivity of 0.4 or less measured based on ASTM C 1371-98. In the present invention, the degree of heat radiation preventing effect can be assessed in terms of far-infrared emissivity. Herein, the "emissivity" is measured according to ASTM C1371-98. More specifically, a sample was supplied with a predetermined amount of heat, and then, reflected heat and radiant heat from the sample were measured using a differential thermocouple. The emissivity is defined as a ratio of the heat emitted by the sample surface at a given temperature to that of a perfect emitter (a black body with emissivity of 1.0) at the same temperature. The differential thermocouple used is not particularly limited, and can be any far-infrared radiometer based on the ASTM standard.

The conventional automobile interior is not changed when the reflectance ratio is noticeably low because temperature increases within the spaces is reduced by reflecting the thermal rays emitted from the exterior panel 11 that functions as a reflective layer. Because of this, in the present invention the emission rate of the reflective material is 0.4 or less and is preferably 0.2 or less.

As mentioned above, the present invention is provided with the second space S2 that is formed by the exterior roof panel 11 and the reflective material 16b in the heat radiation insulating arrangement. This space S2 occupies 20% or more of the area compared to the entire surface area of the exterior roof panel 11. This is due to the fact that at least 20% of the space S2 from among the entire surface area of the exterior roof panel must be spaced by a predetermining gap (10mm or more) in order for the reflective insulating material, which functions to reflect radiant heat from the exterior roof panel 11, to sufficiently achieve its capabilities. In addition, a space of 20% or more is required to attain the capabilities of the air passageway 21. If the space is 20% or less, then the heat transfer between the ceiling base material 16a and exterior roof panel 11 increases in the areas of contact. This heat transfer results in an increase in the amount of heat that enters into the interior of the cabin. In the illustrated embodiment, the space S2 is a single space covering a majority of the surface area of the exterior roof panel 11. Of course, it will be apparent from this disclosure that the space S2 can be split into two spaces such that the front one of the first spaces S1 is fluidly connected to a front ceiling space, and the rear one of the spaces S1 is fluidly connected to a rear ceiling space.

Moreover, preferably, one portion or all of the second space S2 is a space with a gap of 10 mm or more. In other words, it is preferable for the intervals or gaps between the spaces, comprised by the exterior roof panel 11 and the reflective material 16b, to be 10 mm or more, and even more preferable to be 15 mm or more. This prescribed spacing or gap is desirable in order to make it possible to guide the high-temperature air held within the spaces S1, formed by the shades 19 and 20 and the windshields 17 and 18, and then to discharge the heat from the spaces within the ceiling as the heat radiation area by initiating convective heat transfer within the spaces. At 10 mm or less, the temperature increase effect inside the spaces comprised by an exterior roof panel 11 and a reflective material 16b will become lower thereby reducing the chimney effect as well. In the illustrated embodiment, the entire space S2 has a prescribed gap of at least 10 mm, except for the areas of the supports 15.

The reflective layers 19a and 20a are provided on the window side of the light shielding shades 19 and 20, respectively. This is very important to keep the heat energy entering inside the vehicle cabin at minimum levels. Also by providing on the surface of the light shielding shades 19 and 20, the amount of heat that is held by the light shielding shades 19 and 20 is minimized. For this case, it is preferable to use a material with a sunlight reflectance ratio of 60% or more for the most efficient reflective material although there are no particular limitations on the material.

At the same time, the insulating layers 19b and 20b are provided on the inside of the vehicle cabin on the light shielding shades 19 and 20, respectively. When the insulating layers 19b and 20b are not provided on the inside of the vehicle cabin, the light shielding shades 19 and 20 will hold the heat energy generated by the sunlight. Thus, radiant heat will radiate toward the inside of the cabin and the cabin temperature will increase. Consequently, the fact that the light shielding shades 19 and 20 have an insulating layer construction makes it possible to further prevent heat from entering into the cabin. This is not a necessary condition and there are no particular limitations on the construction. In like manner, the side walls inside the cabin are comprised by insulating material in the air passageways 21 formed between the exterior roof panel 11 and the interior of the cabin for the same reason. In addition, the side walls inside the cabin are comprised by insulating material in the air passageways 21 formed by the spaces within the pillars 12, 13 and/or pillar 14 for the same reason also. For this case, it is preferable to use an insulating material with a thermal conductivity of 0.1 W/mK or less for the material comprising each of the insulating layers 19b and 20b although there are no particular limitations on the material.

In the present invention, insulating layers 19b and 20b are comprised to include at least one type of the following materials: polyester fiber non-woven fabric, polypropylene fiber non-woven fabric, felt containing phenol resin, polyurethane foam, polyethylene foam, and polypropylene foam. These insulating layers 19b and 20b do not allow the heat that sustains the high temperature held within the air passageways 21, to be thermally conducted into the cabin. Since it is preferable to use an insulating material with a thermal conductivity of 0.1 W/mK or less, it is also preferable for the material comprising these layers to include at least one type of the following materials: polyester fiber non-woven fabric, polypropylene fiber non-woven fabric, felt containing phenol resin, polyurethane foam, polyethylene foam, and polypropylene foam. It is even more preferable for the installed capacity of the material to be small and the insulation effect to be large. And in addition, a non-woven fabric is preferably used that is composed of a material with an extremely thin fiber diameter. For example, a meltblown non-woven fiber can be used that is available from Toray Fine Chemicals Co., Ltd. and that is produced using polyester or polypropylene resin. Although there are no particular limitations on the material.

In the present invention significant effects were obtained using the construction described above. Namely, desired effects were obtained in the present invention by adopting the construction. In summary, as seen in FIG. 1, basically the light shielding shades 19 and 20, which have reflecting material 19a and 20a on their outer surfaces, are installed inside the vehicle cabin to form the first space S1. These first spaces are linked to the second space S2 between the exterior roof panel 11 and the reflective material 16b (preferably a reflective insulating material). The reflective material 16b (preferably a reflective insulating material) functions as an insulator of the reflective ceiling material 16. The effect of this construction is to have the radiant heat entering from the exterior roof panel 11 being reflected multiple times by the reflective layer 16b which in turn increases the temperature in the second space S2. As a result, the air located inside the first spaces S1 created by the light shielding shades 19 and 20, is pulled upward due to the chimney effect thereby heating the exterior roof panel 11 even more. Heating the exterior roof panel 11 causes the difference between the interior and exterior air temperatures to become larger. The exterior roof panel 11 not only functions as an entry point for the heat but also simultaneously functions as a heat radiating member radiating heat energy held inside the space through the exterior roof panel 11.

Preferably, the following conditions aid in performance of the chimney effect described above. First, a linked construction that increases temperatures at high locations and decreases temperatures at low locations (locations with high/low temperature difference) aid in performance of the chimney effect. Second, the way to transport heat energy should be air. Third, the heat radiation space is preferably about 10 mm or more (one portion or all of the space provided by reflective material 16b and exterior panel 11).

Furthermore, although this is not a required prerequisite, the interior trim should be insulated in order to increase the effect of reducing the temperature inside the vehicle cabin even more. The above mentioned construction achieves the objects of the invention that is to obtain an effect of reducing the temperature inside the vehicle cabin during hot weather.

Now, in a first embodiment, an automobile was constructed in which a fibrous insulation material such as Thinsulate with a surface density 200 g/m$^2$ that is available from 3M was used for the insulating material 16a of the reflective ceiling material 16 in order to obtain the above-mentioned insulation construction. Also, a metallic vapor deposition resin film such as EMBLET MP-25 available from Unitika Ltd. was bonded to the insulating material as the reflective layer 16b on the upper area of the reflective ceiling material 16. Thus, the automobile was then prepared in which the prescribed gap of the second space S2, formed by the reflective material 16b and the exterior roof panel 11, was 10 mm over at least 20% of the surface area of the panel 11. In this first embodiment, the light shielding shades 19 and 20 were also used in accordance with the present invention.

In a second embodiment, an automobile was constructed in which the light shielding shades 19 and 20 were also used in accordance with the present invention. Also, in this second embodiment, a construction was used to prepare an automobile such that the prescribed gap of the second space S2, formed by the exterior roof panel 11 and the reflective material 16b, was 20 mm over at least 20% of the surface area of the panel 11.

In a third embodiment, the construction of this embodiment was used to prepare an automobile in which the prescribed gap of the second space S2, formed by the exterior roof panel 11 and the reflective material 16b, was 10 mm over at least 20% of the surface area of the panel 11. However, in this third embodiment, a ceiling insulating material was not used.

A first comparative example was constructed in which the construction of this example only differs from the first embodiment in that an ordinary automobile was prepared without the use of a light shielding shade or any special construction in accordance with the present invention.

A second comparative example was constructed in which the construction of this example was used to prepare an automobile without the second space S2, formed by the exterior roof panel 11 and the reflective material 16b. However, in this second comparative example, light shielding shades were used similar to the first embodiment.

A third comparative example was constructed in which the construction of this example was used to prepare an automobile in which the distance of the second space, formed by the exterior roof panel 11 and the reflective material 16b, was 5 mm over at least 20% of the surface area of the panel 11. However, in this third comparative example, light shielding shades were used similar to the first embodiment.

The following Table 1 shows the results of an experiment comparing the temperature inside the vehicle cabin and the surface temperature of the exterior ceiling panel 11 after 3 hours passed from 10:00 AM with an outside air temperature of 35° C.

TABLE 1

| | Automobile conditions | Temperature after 3 hours passed (° C.) | |
|---|---|---|---|
| | | Middle interior vehicle cabin | Ceiling exterior panel surface |
| Embodiment 1 | Shades used, with spacing of 10 mm | 40 | 60 |
| Embodiment 2 | Shades used, with spacing of 20 mm | 39 | 62 |
| Embodiment 3 | Shades used with a spacing of 10 mm, but no ceiling insulation material | 45 | 56 |
| Comparative Example 1 | Ordinary vehicle without light shielding shades | 68 | 49 |
| Comparative Example 2 | Shades used, but no spacing | 52 | 52 |
| Comparative Example 4 | Shades used, with spacing of 5 mm | 50 | 54 |

As can be understood from Table 1, the temperature of the exterior roof panel 11 is very high in the embodiments 1, 2 and 3 as compared to the comparative examples 1, 2 and 3 although the middle temperature inside the vehicle cabin is much lower in embodiments 1, 2 and 3 compared to comparative examples 1, 2 and 3. Namely, the temperature inside the vehicle cabin is sufficiently reduced by the chimney effect.

Figure 3:
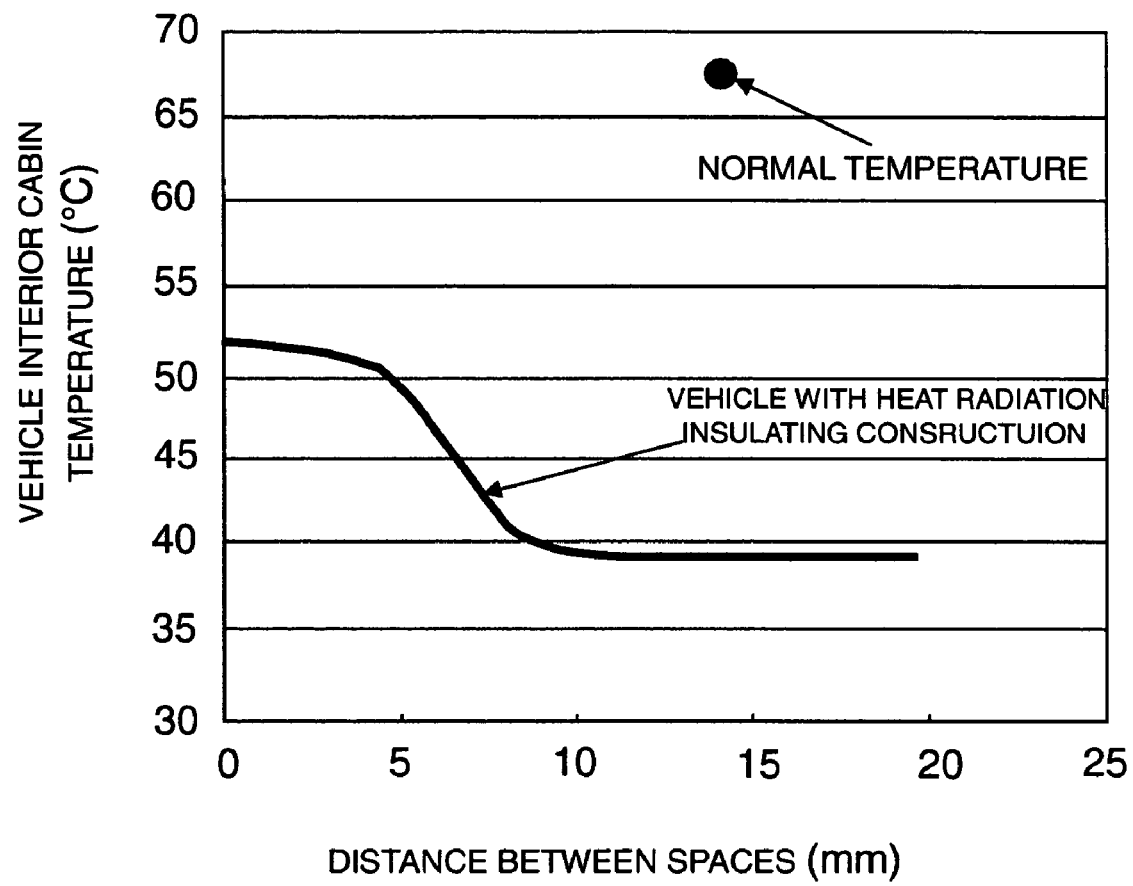
FIG. 3 is a graph that shows changes in the middle temperature inside the vehicle cabin as the distance of the space formed at the upper area of the roof of the heat radiation insulating arrangement changes in accordance with one preferred embodiment of the present invention.

FIG. 3 shows changes in the middle temperature inside the vehicle cabin due to the gap between the second space S2 based on these results. As shown in FIG. 3, it is understood that if the prescribed gap of the second space S2 is maintained at 10 mm or more, convective heat transfer will be very effective.

As used herein, the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention. The terms that are expressed as "means-plus function" in the claims should include any structure that can be utilized to carry out the function of that part of the present invention. The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to Japanese Patent Application No. 2003-130942. The entire disclosure of Japanese Patent Application No. 2003-130942 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A vehicle body structure comprising:
   a vehicle cabin including an exterior roof panel and a windowpane;
   a light shielding shade arranged on a cabin interior side of the windowpane to form a first air space therebetween; and
   a reflective ceiling material arranged on a cabin interior side of the exterior roof panel to form a second air space therebetween, the first and second air spaces being fluidly connected by an air passageway that to allow air to flow between the first space and the second space.

2. The vehicle body structure as recited in claim 1, wherein
   the reflective ceiling material includes a reflective layer disposed on top of an insulating layer such that the reflective layer faces the second air space and the insulating layer is disposed on a cabin interior side of the reflective layer.

3. The vehicle body structure as recited in claim 2, wherein
   the reflective layer includes at least one of a metallic foil and a metallic vapor deposition film.

4. The vehicle body structure as recited in claim 3, wherein
   the insulating layer includes at least one of a fibrous aggregate and a foam layer.

5. The vehicle body structure as recited in claim 2, wherein
   the second space occupies at least 20% of surface area of an entire surface area of the exterior roof panel.

6. The vehicle body structure as recited in claim 1, wherein
   the second space occupies at least 20% of surface area of an entire surface area of the exterior roof panel.

7. The vehicle body structure as recited in claim 1, wherein the second space has a gap of at least ten millimeters between the exterior roof panel and the reflective ceiling material over at least a portion of the second space.

8. The vehicle body structure as recited in claim 2, wherein
the second space has a gap of at least ten millimeters between the exterior roof panel and the reflective ceiling material over at least a portion of the second space.

9. The vehicle body structure as recited in claim 8, wherein
the light shielding shade includes a reflective layer disposed on a window facing side of the light shielding shade.

10. The vehicle body structure as recited in claim 9, wherein
the light shielding shade includes an insulating layer disposed on a cabin interior facing side of the light shielding shade relative to the reflective layer of the light shielding shade.

11. The vehicle body structure as recited in claim 10, wherein
the second space having the gap of at least ten millimeters occupies at least 20% of surface area of an entire surface area of the exterior roof panel.

12. The vehicle body structure as recited in claim 1, wherein
the light shielding shade includes a reflective layer disposed on a window facing side of the light shielding shade.

13. The vehicle body structure as recited in claim 12, wherein
the light shielding shade includes an insulating layer disposed on a cabin interior facing side of the light shielding shade relative to the reflective layer of the light shielding shade.

14. The vehicle body structure as recited in claim 9, wherein
the reflective layers have emission rates of 0.4 or less measured based on ASTM C 1371-98.

15. The vehicle body structure as recited in claim 1, wherein
the light shielding shade includes an insulating layer disposed on a cabin interior facing side of the light shielding shade.

16. The vehicle body structure as recited in claim 9, wherein
the insulating layers are comprised to include at least one type of the following materials: polyester fiber non-woven fabric, polypropylene fiber non-woven fabric, felt containing phenol resin, polyurethane foam, polyethylene foam, and polypropylene foam.

17. The vehicle body structure as recited in claim 1, wherein
the windowpane is a front windshield.

18. The vehicle body structure as recited in claim 1, further comprising
a rear windshield and a light shielding shade arranged on a cabin interior side of the rear windshield to form an air space therebetween that is fluidly connected to the second space by an air passageway.

19. A vehicle body structure comprising:
vehicle cabin means for forming an upper vehicle cabin portion including an exterior roof panel and a windowpane;
light shielding means for shielding light passing through the windowpane, and for forming a first air space between the windowpane and the light shielding means; and
reflective ceiling means for forming a second air space between the exterior roof panel and the ceiling means such that the first and second air spaces are fluidly connected to allow air to flow between the first space and the second space.

20. A method of controlling vehicle temperature of a parked vehicle comprising:
providing a vehicle cabin with an exterior roof panel and a windowpane;
providing a light shielding shade on a cabin interior side of the windowpane to form a first air space therebetween; and
providing a reflective ceiling material arranged on a cabin interior side of the exterior roof panel to form a second air space therebetween such that the first and second air spaces are fluidly connected by an air passageway that to allow air to flow between the first space and the second space.

* * * * *